Aug. 30, 1960 H. A. FROMMELT ET AL 2,950,523
CUTTING TOOL AND METHOD OF MAKING
Filed May 15, 1956 6 Sheets-Sheet 1

Inventors
HORACE A. FROMMELT
FRED ABERLIN

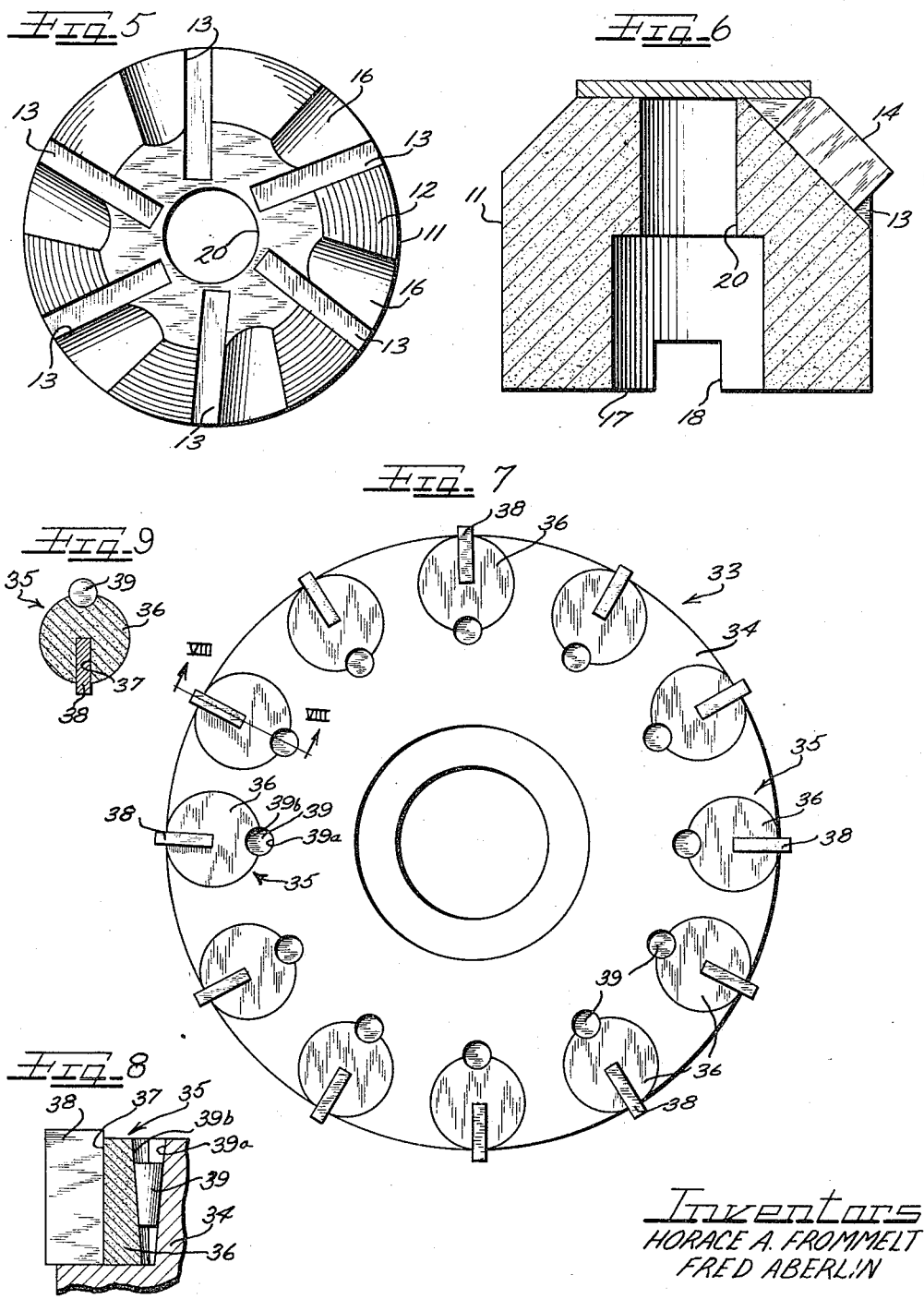

Aug. 30, 1960     H. A. FROMMELT ET AL     2,950,523
CUTTING TOOL AND METHOD OF MAKING
Filed May 15, 1956     6 Sheets-Sheet 3
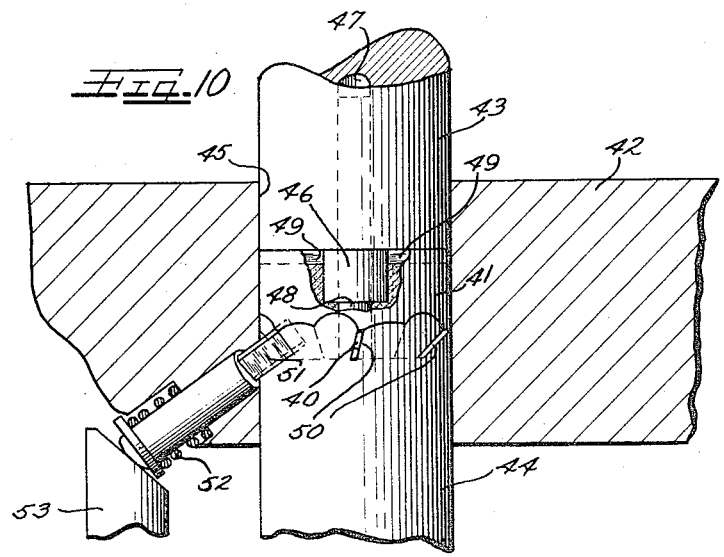
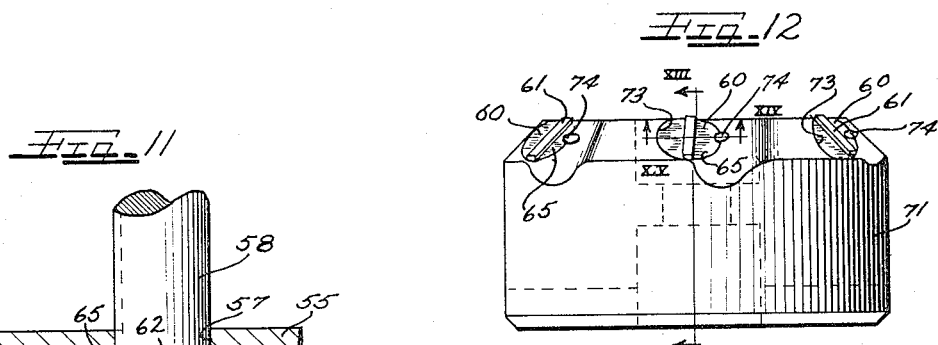
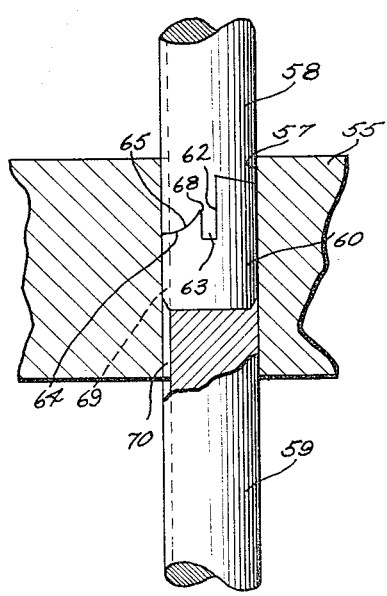
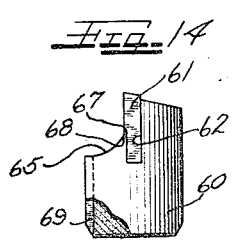
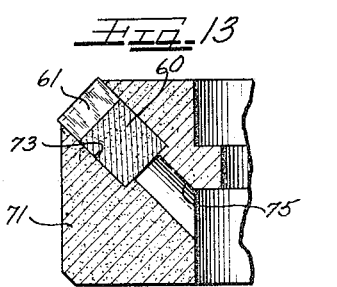
Inventors
HORACE A. FROMMELT
FRED ABERLIN

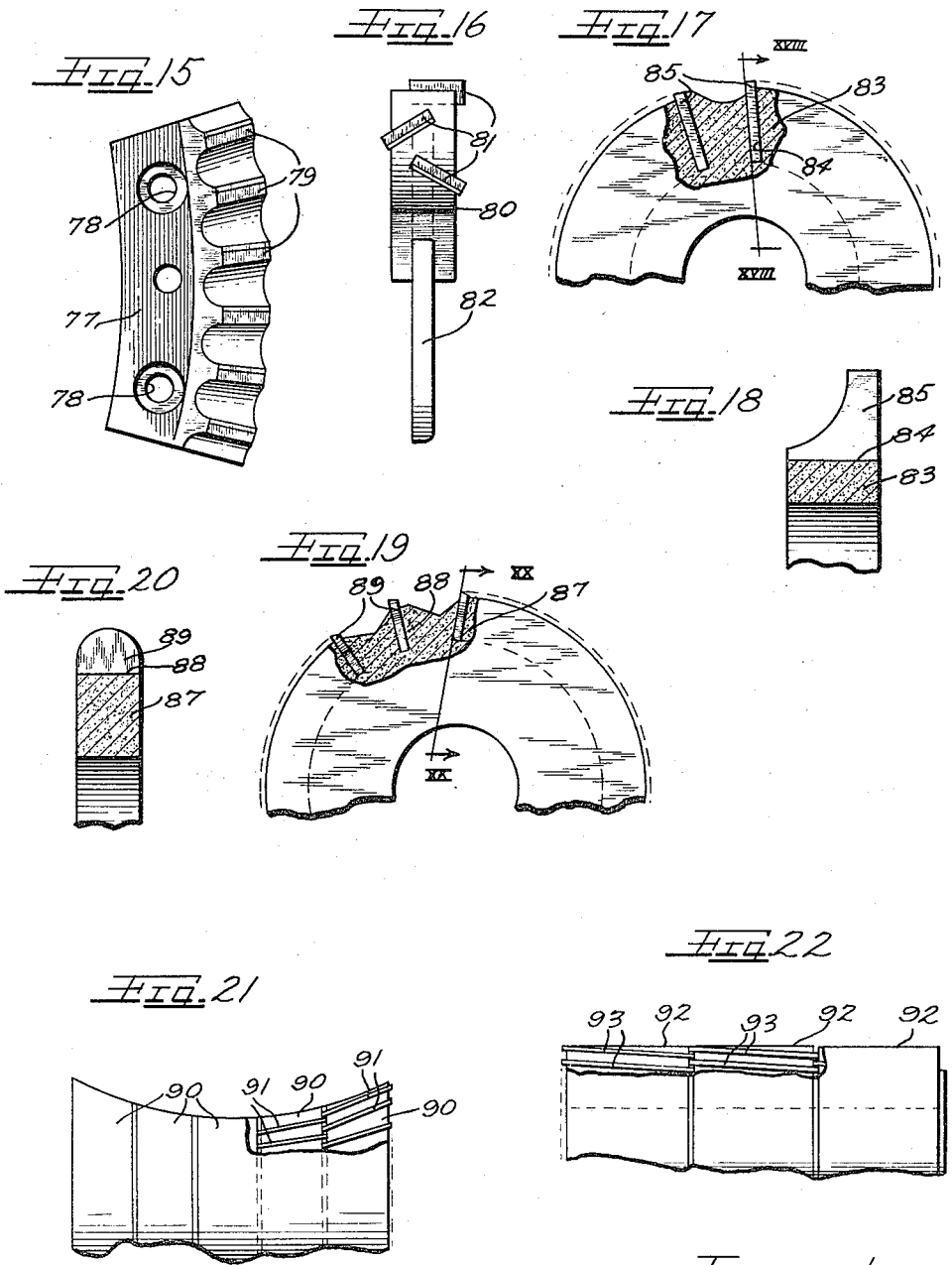

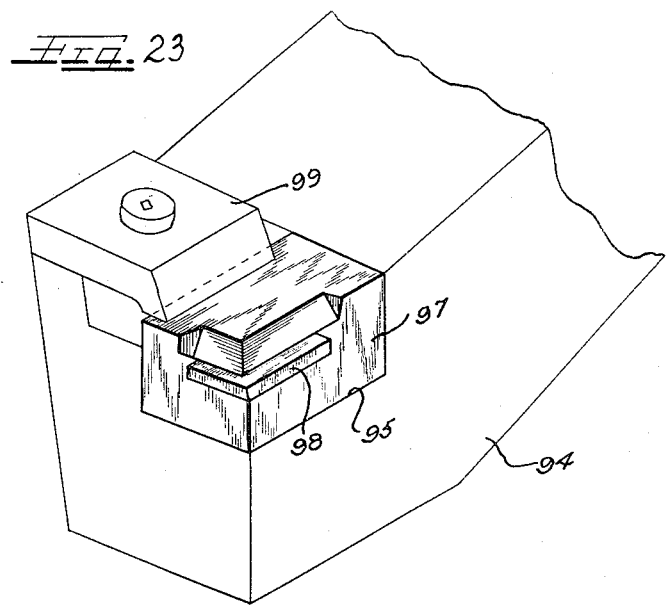
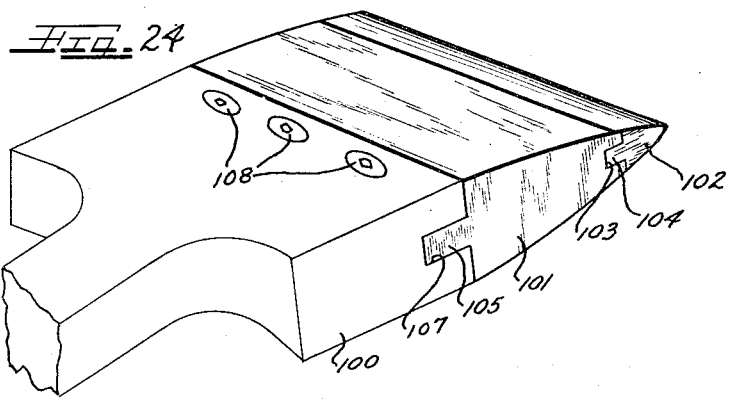
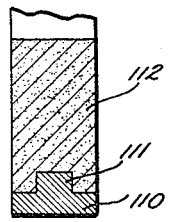
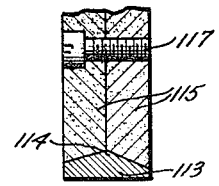
Inventors
HORACE A. FROMMELT
FRED ABERLIN Aug. 30, 1960   H. A. FROMMELT ET AL   2,950,523
CUTTING TOOL AND METHOD OF MAKING
Filed May 15, 1956   6 Sheets-Sheet 6
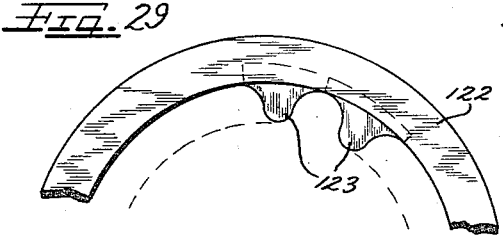
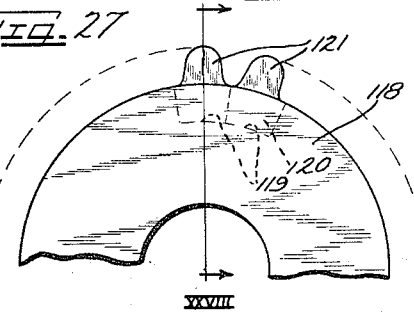
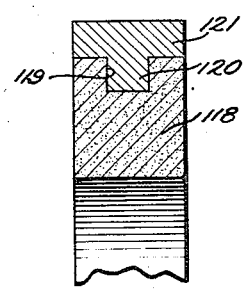
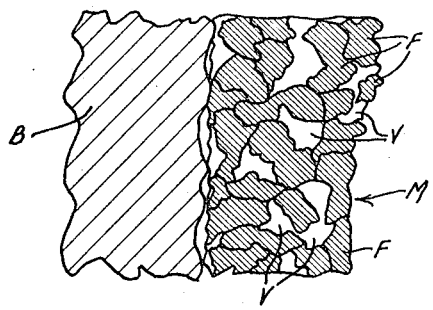
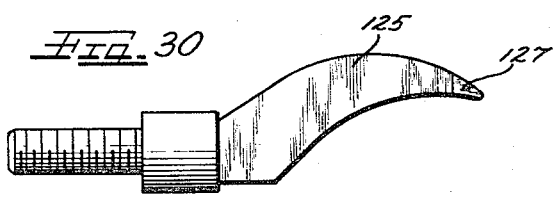
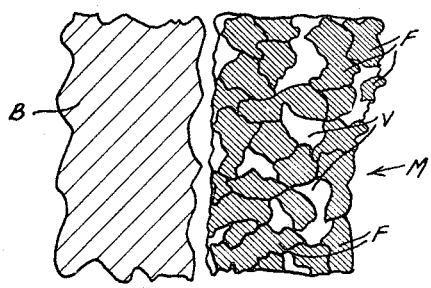
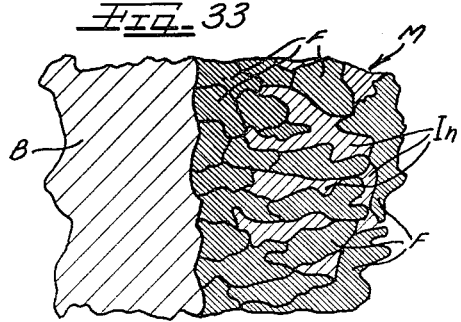
Inventors
HORACE A. FROMMELT
FRED ABERLIN

United States Patent Office 2,950,523
Patented Aug. 30, 1960

2,950,523

CUTTING TOOL AND METHOD OF MAKING

Horace Aloysius Frommelt, Philadelphia, Pa., and Fred Aberlin, Avon Township, Lake County, Ill., assignors to John A. Bitterli, Chicago, and William G. Hessler, La Grange, Ill., and Horace A. Frommelt, Philadelphia, Pa., trustees Filed May 15, 1956, Ser. No. 585,039

9 Claims. (Cl. 29—95)

This application is a continuation-in-part of our copending application Serial No. 512,604 filed June 2, 1955.

The present invention relates to improvements in mounting of hard bits, regarding which may be mentioned by way of example and not by way of limitation, various shaping and cutting tools for working upon different materials such as metal, stone and non-metallic materials, mining tools, rock drills and boring tools, earth working tools, picker fingers such as are used in the textile or weaving industry, and various other tools and working elements requiring wear resisting tips or working surfaces or edges.

In the mounting and use of bits of this kind two major problems are presented. One of these problems resides in the excessive costs and inherent practical difficulties involved in mounting of the bits for use, since the materials from which such bits are made generally are not satisfactory for the mounts or holders for the bits, due to high cost and generally also due to characteristics of the bit material precluding desirable working or machining. The other major problem resides in the often experienced limitations upon performance of tools or devices having such hard bits, due to vibrational interferences with operation, such as limitations upon speed of operation, depth of cut in the case of cutters, tool and equipment break down, and the like.

By way of more specific example, difficulties in the manufacture of cutting tools employing hard cutting elements such as tungsten carbide, titanium carbide, high speed steel, ceramics, or similar cutting bits or elements, occurs in properly mounting the cutting elements in the face of the tool. For instance, raw tungsten carbide bits in the sintered condition in which they are received from the manufacturers have relatively rough, uneven non-planar surfaces. In prior practice, such surfaces are invariably ground down by means of diamond abrading tools or the like, or otherwise abraded to produce as smooth or clean surface on the bit as possible. The reason for this lies in the fact that the cutter bits are commonly disposed in or on the face of the cutting tool body and either held therein or thereon by means of wedge or clamping elements which engage one or more surfaces of the cutter bit with sufficient pressure to hold the cutter bit in place, or the bits are brazed in place.

Because of the extremely brittle nature of carbide and ceramic bits, surface irregularities on the bits promote their fracture. It is at present common practice to grind these bits down, in order to minimize the danger of breakage if clamping is to be employed for holding the bit, or to provide a satisfactory brazing surface if brazing is to be employed. This time consuming grinding or abrading operation adds substantially to the cost of the tool. It is estimated that the grinding operation increases the cost of using the average bit by a factor of as much as about twice the price of the raw bit.

Since the cost of ground carbide bits was heretofore a substantial cost factor in finished cutting tools, it was deemed necessary to resurface the bits when they became dull in order to prolong their usefulness. This meant removing the bits from the cutting tool holders or bodies, resurfacing with an expensive diamond grinding operation and then realigning and readjusting the bits in their mounts. Thus, the cost of using the tools included not only the initial high cost, but also the substantial refinishing operations necessary throughout the useful life of the tools.

From an operational point of view, the prior means for securing the carbide bits in place have further disadvantages. For example, if clamping is employed the clamping means themselves occupy a substantial portion of the area on the cutting face of the tool so that the number of cutting bits which can be spaced around a given diameter of tool face is inherently limited by the necessity of providing adequate clamping means. If, on the other hand, brazing is to be employed as the means for holding the bit the fuse-bonding sets up deleterious stresses due to the differences in coefficients of expansion of the bit and the bond and the holder, causing frequent breakage of the costly bits. Furthermore, where clamping and wedging procedures are employed, the space occupied by the clamping and wedging means has also seriously limited the applicability of hard bits in small size tools. Again, prior procedures have required the use of relatively larger and costlier bits in order to afford sufficient bit tensile strength to be practical for use with the less satisfactory prior methods of holding the bits by clamping or brazing.

In the matter of prior vibrational disadvantages, it is, of course, well known that vibrational fatigue accounts for much tool failure and equipment wear and rapid deterioration. It is also a principal cause of operating noises in high speed machinery and apparatus. In cutting tools, the factor of vibration seriously limits the speed of operation and depth of cut, leaves chatter marks on the work, and also places terrific and destructive stresses upon the tools and more especially the cutting bits or elements. Vibration thus reacts in numerous potent ways to increase production costs.

As heretofore practiced, brazing of the cutter bits in tool holders, that is, either by inserting the bits in oversize sockets in the holders and then while holding the bits in centered relation in the sockets filling the spaces or gap about the bits in the sockets with a cementing or adhering matrix of brazing alloy which is molten to fill in the socket space about the bits, or by shim brazing onto a prepared surface, has the distinct disadvantages of difficulty in properly adjusting cutting or working angles of the bits, high cost, limitations upon speed of operation and development of very harmful stresess between the bits and the holders resulting in excessive breakage, among others.

It is accordingly an important object of the present invention to provide a new and improved method of, and means for, mounting bits in a manner which will provide substantial economies in production, provide for increased service, and substantially eliminate or at least greatly minimize vibrational difficulties in service.

Another object of the invention is to provide an improved method of manufacturing tools and implements equipped with hard bits or wear elements.

A further object of the invention is to provide an improved method of manufacturing cutting tools, or the like, including ceramic or cemented carbide cutting elements.

Still another object of the invention is to provide an improved method of forming a tool matrix which, because of its properties, is capable of securing a hard bit such as a carbide or ceramic cutting element or wear tip or surface, or a natural hard mineral bit such as diamond or garnet, securely in place.

Yet another object of the invention is to provide an improved bit-equipped tool in which metal of the tool holder itself fixedly clamps the bit or cutting element in position without the necessity of extraneous clamping or holding means being provided or any need for brazing.

It is also an object of the invention to provide an improved method of and means for retaining in a matrix or holder hard bits without any need for finishing off or grinding surfaces of the bits engaged within the matrix or holder, whereby it is practical to use, for example, cemented carbide or ceramic bits just as derived in what may be referred to as a raw sintered state and without any machining or grinding but, as a matter of fact, taking advantage of the surface roughnesses or irregularities of the bits for holding them positively in the matrix or holder.

A yet further object of the invention is to provide an improved method of and means for making implements or tools having hard cutting bits, and more particularly cutting tools such as cemented carbide or ceramic tipped tools or cutters, whereby the tools or cutters are produced sufficiently inexpensively so that it is economical to dispose of or throw the tool or cutter away when the wear surface or cutting edge becomes dull or worn, rather than attempt to resurface or reshape or resharpen the hard surface or bit.

Among other objects of the invention are the provision of tool bit or element retention in a matrix or holder under such uniform pressure as to avoid damaging gripping stresses even under thermal expansion differentials; the provision of a cushioned but nevertheless extremely firm direct retaining grip by the holder or matrix of a bit or hardened tool element; and the provision of a highly efficient vibration damping matrix or holder relationship to hard bits or tool elements carried thereby.

Other objects, features and advantages of the present invention will be readily apparent from the following detailed description of certain preferred embodiments thereof, in certain respects exemplified or described in connection with the accompanying drawings, in which:

Figure 5 is a face plan view of a compact or matrix as may be produced by the apparatus of Figure 4;

Figure 6 is a cross-sectional view through a tool holder matrix or compact as shown in Figure 5 having a bit or cutting element inserted in a receiving socket therefor;

Figure 7 is a face plan view of a modification depicting a removable blade milling cutter assembly;

Figure 8 is a fragmentary sectional detail view taken substantially along the line VIII—VIII of Figure 7;

Figure 9 is a fragmentary sectional detail view taken substantially along the line IX—IX of Figure 8;

Figure 10 is a more or less schematic vertical sectional elevational view showing a modified compacting die apparatus;

Figure 11 is a vertical sectional elevational view showing yet another modified compacting die apparatus;

Figure 12 is a side elevational view of a modified tool in the form of a milling cutter, disclosing the use of tool holders and cutting tool bits supported thereby, embodying holders of the type that may be made by the apparatus of Figure 11;

Figure 13 is a fragmentary sectional detail view taken substantially on the line XIII—XIII of Figure 12;

Figure 14 is a fragmentary sectional detail view taken substantially on the line XIV—XIV of Figure 12;

Figure 15 is a side elevational view of a further modified bit or cutter holding matrix or body;

Figure 16 shows another modification of tool holder;

Figure 17 is a fragmentary side elevational view partially in section of another form of cutter embodying features of the invention;

Figure 18 is a fragmentary sectional detail view taken substantially on the line XVIII—XVIII of Figure 17;

Figure 19 is a fragmentary side elevational view of a cutter similar to Figure 17 but showing a modified arrangement and shape of cutter teeth;

Figure 20 is a fragmentary sectional detail view taken substantially on the line XX—XX of Figure 19;

Figure 1:
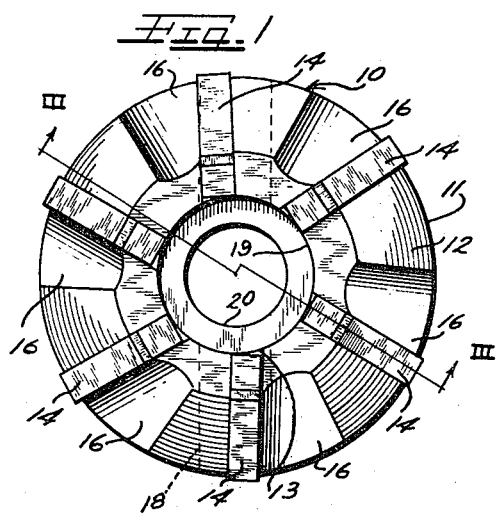
Figure 1 is a face plan view of a cutting tool produced by the method of and embodying features of the present invention.
Figure 2:
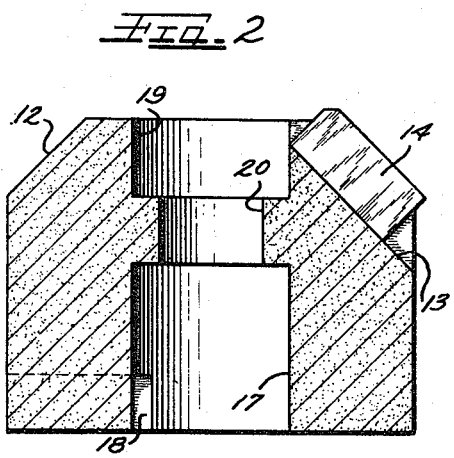
Figure 2 is a side elevational view of the cutting tool shown in Figure 1.
Figure 3:
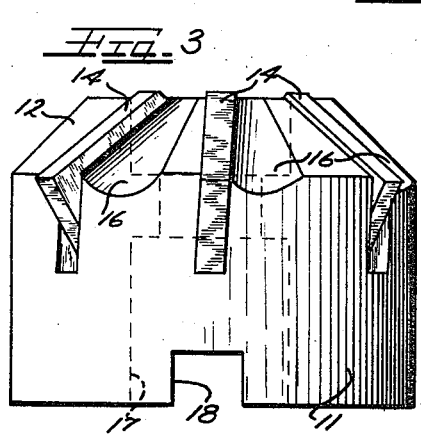
Figure 3 is a cross-sectional view taken substantially along the line III—III of Figure 1.

Figure 21 exemplifies the invention as applied to a sectional form cutter;

Figure 22 shows the invention as applied to a sectional slab mill;

Figure 23 depicts an exemplary arrangement of a single point tool such as a lathe or boring tool arrangement;

Figure 24 illustrates the invention as applied to a chisel type of tool;

Figure 25 shows the invention as applied to a form of slitter knife;

Figure 26 shows a modified arrangement of slitter knife utilizing the invention;

Figure 27 illustrates an arrangement of gear teeth utilizing the invention;

Figure 28 is a fragmentary sectional detail view taken substantially on the line XXVIII—XXVIII of Figure 27;

Figure 29 illustrates application of the invention to an internal gear;

Figure 30 shows how the invention is adapted for application to a device having a wear tip such as a picker finger;

Figure 31 is a fragmentary enlarged more or less schematic showing of the relationship of the opposed surfaces of a bit and a holder during initial assembly and before infiltration;

Figure 32 shows the relationship of the surfaces of the bit and matrix or holder during heating for infiltration but before the infiltrant flows; and Figure 33 shows the relationship of the surfaces after infiltration.

According to the present invention, hard bits or wear elements are fixedly retained in a supporting holder or body by direct interengagement of the opposing surfaces of the bit and a socket in the body within which the bit is received. In a preferred form, the holder or body comprises a sintered powdered metal matrix or compact. As used herein the term "bit" should be understood to mean the hard piece whether it be metallic or non-metallic and whether it be a cutter or blade or wear part or element which is supported in or on a matrix.

We have found that exceptional results are obtained by using a matrix formed of a sintered powdered metal infiltrated with a growth promoting or producing material or metallic substance. While it may be possible to use various types of powdered metal matrices, sintered iron has been found most economical. Ordinary iron powder of about 98% Fe is generally satisfactory although in order to impart certain desirable properties in specific instances or for particular applications, various amounts of manganese, molybdenum, copper, carbon or the like may be included with the iron. The metal powder is compacted and sintered whereby the particles of metal powder are caused to adhere together at their points of contact. By preference the particles or grains of metal powder are of relatively fine mesh having a relatively coarse porosity within the particle bodies, and the compaction density is maintained at as low a limit as will enable the green matrix to be efficiently handled. Particle size may range from around 80 mesh to about 325 mesh, having preferably a preponderance of particles of smaller than 200 mesh.

Since infiltration is relied upon to effect locking of the bit in the matrix, as great porosity (consistent with density required for tensile strength) of the matrix and therefore as great capacity for absorption of infiltrant as practicable is desirable. In a matrix of Fe powder, densities between about 5 grams per cubic centimeter and 7 grams per cubic centimeter with optimum densities in between, that is, from about 5.8 grams per cubic centimeter to about 6.5 grams per cubic centimeter, depending upon the tensile strength and ductility properties required in any given situation, have been found suitable. It will be understood, of course, that the greater densities yield greater tensile strength and greater ductility. However, for optimum porosity as low a density should be used as practicable.

Sintering of the matrix should be carried out under such conditions of time and temperature as to afford sufficient tensile strength and ductility for the intended use of the matrix. For most bit holding matrices very great tensile strength is not a prerequisite, and it has been found that generally sintering of Fe matrices up to about 2200° F. will suffice, although in some instances up to 2300° F. may be desirable, while good results have also been obtained at sintering temperatures down to about 2050° F. Sintering may be effected within a range of from about 15 minutes to 1 hour depending on the size and configuration of the matrix and type of powdered Fe. Following sintering, the method and rapidity of cooling does not appear to be critical. Ordinary furnace cooling has been found satisfactory.

The matrix may be provided with one or more bit recesses or sockets in the green state, as for example during compacting, or it may be provided with such socket recess or recesses by machining the same after compacting or sintering. In either event the recesses should be held to as close tolerances as practicable relative to the bits or rather the butt or stem or body portion of the bit to be received within the recess or socket. Typically, a tolerance of about .0005 inch plus or minus in bit thickness and a like tolerance of .0005 inch plus or minus in recess width, making a maximum aggregate tolerance between bit and recess walls of .001 inch, is preferred. This will generally result in a more or less press fit although a close sliding fit is satisfactory. For extra high retaining compression the bit may be assembled in a slightly undersize socket by thermal expansion of the matrix and inserting the bit in the thus opened socket. Where the socket is much oversize as may be necessary with some bits such as may have thickened butt portions, the matrix may be peened or swedged to close the socket onto the bit. If desired, the socket may be dovetailed and the bit complementary in at least the socketed portion.

After assembly of the sintered matrix and bit has been effected, infiltration of the matrix, and thereby locking of the bit in its socket, is accomplished. By virtue of its economy and growth properties, copper for infiltration has been found most satisfactory. Because of the excellent growth factor incident to copper infiltration of a sintered iron matrix, quite effective locking of a bit in its socket in such a matrix is experienced. In a preferred relationship, the copper base infiltrant preferably comprises from 90% to 97% Cu and the balance Fe depending on the temperature at which infiltration is to be effected. A high copper content or base alloy such as brass or bronze also may be used by preference or because of more ready availability. Therefore, herein the term "copper infiltrant" or "copper infiltration" or "cupreous infiltration" or similar expression denotes a suitable high copper content material or alloy.

Since copper has a substantial affinity for iron at infiltration temperature it is desirable that the appetite of the infiltrant for iron be presatisfied by including in the infiltrant a proper proportion of the iron so as to minimize erosion of the sintered matrix. The higher the infiltration temperature, the relatively greater proportion of iron content should be used for best results.

Infiltration is effected by having the sintered matrix and bit assembly in intimate contact with the infiltrant at proper infiltration temperature for an adequate time interval and in the presence of a predetermined or measured quantity of infiltrant, preferably to fill the porous structure of the matrix as nearly as practicable with the infiltrant. The amount of infiltrant that a matrix will accommodate is substantially governed by the density of the matrix. For example, an Fe matrix of 98% plus iron at about 5.8 grams per cubic centimeter density has a porosity of about 30%. Infiltration may fill about ⅔ of this porosity, thus adding about 20% to the mass of the matrix. It is desirable to bring the matrix to infiltration temperature as rapidly as possible. The infiltration period at full heat should be governed by the size and configuration of the matrix. For example, the infiltration period for a 3″ diameter by 1″ thick matrix may satisfactorily range from 10 to 45 minutes. The infiltration temperature may range up to 2100° F. for high content copper infiltration. When using brass or bronze infiltrant somewhat lower infiltrating temperatures are practical. Cooling of the matrix may be controlled to produce certain desirable results. By slow cooling greater ductility is produced. Greater tensile strength is attained by faster cooling.

After cooling it will be found that the walls of the matrix defining the bit receiving socket have closed in on the bit with uniform compression to thoroughly bind and lock the bit in the socket.

By reference to Figures 31, 32 and 33 graphic visualization is afforded of the relationships between the bit and the matrix at various stages leading up to and during the infiltration process. These figures aim to show more or less schematically what has been experienced and observed, and are reasonable facsimiles of the structures as though enlarged to about 500 times normal size. In other words, only rather minute actual portions of the elements are thus shown in Figures 31, 32 and 33.

In Figure 31 the initially assembled relationship of the bit and matrix is illustrated. A portion of a bit B is shown in sliding or press fit relation to a portion of a sintered iron matrix M. The opposing surfaces of the bit and matrix appear relatively irregular when thus greatly enlarged, with only the high points touching or in close proximity. The bit B may be a cemented carbide or ceramic having the surface thereof, so to speak, raw as it is at the completion of sintering of the bit and without grinding or machining. The porous sintered iron matrix includes a skeleton of fused together iron particles F with connected porosity voids V running through the skeleton. Substantially the same relationship will be present between a natural mineral bit and a matrix socket.

In Figure 32 is shown the relationship of the opposing faces of the bit B and the matrix M about as they appear just before reaching temperature at which the infiltrant flows and growth begins. It will be observed that the opposing faces of the elements have separated slightly due to differences in coefficient of expansion, the relatively softer and more porous matrix M expanding more than the relatively harder and much more dense bit B.

In Figure 33 is shown the relationship of the elements as a result of infiltration growth. It should be noted that the matrix particles F have grown or been pushed toward and into tight engagement with the bit at the interface of the elements so that the irregularies and pits or concavities in the opposing surface of the bit B are filled by the matrix skeletal particles at the interface while the voids or pores or passages B of the matrix M have been filled with the infiltrant represented by In. While at some points the infiltrant In may directly contact the surface of the bit B, the principal engagement of the surface of the bit B is by the material of the matrix due to infiltration growth. This relationship is apparently attained during infiltration and by growth of the matrix into the expansion gap that opens at the interfaces of the bit and matrix. Then when maximum growth has been reached and the infiltrated unit has cooled and the matrix shrinks back toward the cold state there is a tendency to take up the expansion gap or slack depicted in Figure 32, but since this gap is now at least substantially filled in due to infiltration growth, strong binding pressure develops toward the bit.

It is therefore quite evident that engagement of the bit by the matrix as a result of infiltration is not a brazing or bonding or fusion action wherein the one element adheres to the other, but a mechanical binding, gripping action wherein the material of the matrix has been crowded for snugly filling into the depressions in the opposing surface of the bit and with the high points of the bit surface in intaglio in the opposing surface of the matrix. This together with the shrinkage pressure developed on cooling affords a positive mechanical interlock of the opposing surfaces. Such relationship has been verified by severing a matrix as close as practicable to the engaged surface of a bit and then prying the thin remaining layer of the matrix from the surface of the bit with relatively little pry-away force. By having the infiltration-growth engaged and locked surfaces of the bit serrated or otherwise deliberately roughened even greater interlocking advantage may be attained.

In summation, therefore, of the explanation of the extraordinarily effective gripping of the bit, which is the crux of our invention, the following may be noted: As as result of the difference in coefficient of expansion between the bit and the matrix, a space opens between the bit and the walls of the socket in the matrix as the matrix is brought up to infiltration heat. When the infiltrant reaches the melting point and begins to flow, it rapidly fills the pores in the matrix, whereupon the alloying which occurs between the iron skeleton of the matrix and the molten copper infiltrant causes the metallurgical phenomnon of growth. This growth has been found to involve an actual mobility of the metallic particles in the direction of least resistance, and thus in the present instance into the thermally produced space or gap or clearance between the bit and the socket walls, which is thereby filled and the socket walls assume a contour substantially intaglio with the surfaces of the bit. Then, upon cooling of the matrix after infiltration, the greater contraction or shrinkage of the matrix due to the greater coefficient of expansion of the matrix produces the final strong binding, gripping retaining compression upon the bit.

It will be understood that where a copper infiltrant is referred to herein it may comprise various suitable alloys of copper or copper powder mixed with other powder material in suitable proportion. Whereas a copper iron mixture or solution has been mentioned, various copper alloys such as brass or bronze are in some cases preferred as better adapted to meet particular requirements.

If desired, the copper infiltrated matrix can be subjected to various treatment steps to improve the machinability, vary the ductility or tensile strength, or the like.

By virtue of the uniformly intimate gripping of the bit by the material of the matrix no particular area of the bit is subjected to any undue strain or pressure or stress but the bit is held under uniform compression over its entire gripped surface. This is a highly desirable and valuable relationship during any heat treatment of the united assembly, and also during use where heating may occur. Even though there may be substantial differences in coefficients of expansion between the bit and the supporting matrix, the bit receives no uneven stresses or strains such as occur in prior practices of wedging or brazing bits onto tool holders or shanks, nor is any spot or area of the bit relieved of compression non-uniformly relative to any other point or area. In effect, there is a continuous cushioned compression grip uniformly over every portion of the gripped area of the bit and though such cushioned grip may vary as to intensity during temperature fluctuations, the grip nevertheless remains substantially uniform.

The present invention lends itself to the efficient holding of cemented carbide such as tungsten or titanium carbide bits, high speed tool steel bits, ceramic bits, precious mineral bits such as diamond or garnet, and any other types of bits that are capable of withstanding infiltration temperatures. Furthermore, due to the great flexibility as to size and shape as well as variety of styles of bits that may be supported by the infiltrated matrix holders a virtually infinite variety of tools and implements may utilize the present invention. Among these may be mentioned, by way of example, and not by way of limitation, milling cutters, planing cutters, inserted tooth saws, lathe tools, boring tools, drills, impact tools such as chisels, chipper knives, slitters, gears, gripping or working fingers such as picker fingers and other types of elements that must maintain sharp points or edges or resist wear.

A number of specific examples will now be given. For example, in Figure 1 is shown a cutting tool 10 produced according to the present invention and including a matrix 11 forming the body of the tool. The cutting face of the tool 10 includes a beveled margin 12 within which is provided a plurality of circumferentially spaced generally radially extending socket grooves 13 which are preferably offset slightly from the radius and also from the axis of the body 11 to provide for placement of bits 14 at such radial and axial angles as are best suited to the type of work that the cutter is intended to do. The beveled face portion 12 is also provided with chip clearance grooves 16 along one side of the cutter bit socket grooves 13. Centrally the tool matrix 11 is provided with a central bore 17 with a transverse keyway 18 across the base end of the bore and an upper counterbore 19 with an intermediate reduced diameter bore portion 20.

According to the present invention, the cutter bits 14 may be in a raw, unground condition just as sintered to shape, where they comprise, for example, cemented carbide or ceramic structures.

Figure 4:
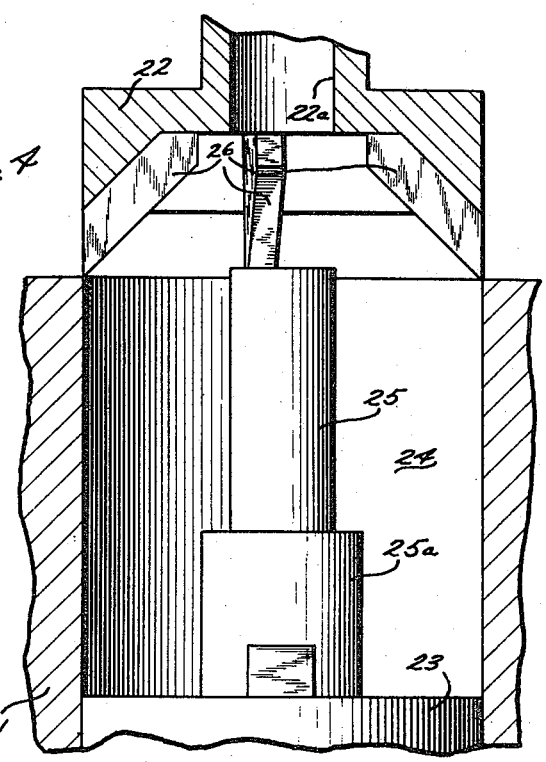
Figure 4 is a more or less schematic, exploded vertical sectional view of molding apparatus that may be employed in the formation of matrices or compacts of powdered metal to serve as supporting bodies or holders for tools such as shown in Figures 1-3.

Initially the matrix 11 is preferably formed as a powdered metal compact in an apparatus such as a compacting mold or die assembly more or less schematically illustrated in Figure 4, including a die or mold 21 within which is operable an upper punch 22 and a lower punch 23. A molding cavity 24 is defined in the die member 21 within which the two relatively reciprocably movable punch members 22 and 23 are operable. A core, stem or rod 25 may be carried by the lower punch 23 and is slidably receivable in a bore 22a of the upper punch member 22. About the base of the core rod 25 is a counterbore boss 25a.

When the proper quantity of metal powder has been introduced into the mold cavity 24 over the punch member 23, the punch members 22 and 23 are moved relatively toward each other and thereby compress the powder. Although the socket grooves 13 may, of course, be machined in the matrix compact either green or after sintering, they may also be formed in the matrix during compacting by means of complementary spaced forming ribs 26 on the upper punch member 22. Likewise the chip clearance grooves 16 in the beveled face 12 may be machined in the compact or the sintered matrix or may be formed by means of appropriate forming surfaces (not shown) on the punch member 22 adjacent to the ribs 26.

After the green compact is removed from the molding cavity 24, it has the appearance indicated in Figure 5. Then the compact is sintered. Following sintering of the compact the blade bits 14 are inserted in the slots 13 and the matrix is infiltrated, preferably in a protective, non-oxidizing atmosphere. Satisfactory means such as suitably designed holding fixtures may be provided to hold the bits or blades against slipping out of position when the slots or sockets open up due to expansion of the matrix during infiltration. When the sockets thus open up there will be a final gravitational adjustment to correct any inaccuracies in positioning of the blades to the bit cutters or blades due to sticking or otherwise.

For infiltration, a slug of infiltrant metal 31 may be placed on top of the sintered matrix as shown in Figure 6. Such infiltrant slug may optionally be placed in the counterbore 17 and the matrix may be turned upside down or the slug may even be placed under the matrix as infiltration will occur by capillary attraction so long as the infiltrant is in contact with the matrix during infiltration heat. During the infiltration heat, which may be effected in a suitable furnace, the infiltrant metal melts and enters the porous skeleton of the matrix and thereby effects the infiltration growth and thus the closing or shrinking of the socket walls into a cushioned, gripping engagement with the cutter bits 14.

The counterbore 19 may be machined in the top end of the matrix before or after infiltration.

In the modification in Figures 7–9, a milling cutter 33 is shown as including a cylindrical body 34 which has cylindrical sockets spaced equidistantly about the margin thereof for receiving tightly therein respective cutter elements 35 each of which includes a complementary cylindrical sintered powdered metal matrix body portion 36 having a radially opening cutter bit slot or socket 37 extending longitudinally therein and having locked in the socket by infiltration, a cutter bit or blade 38. The cutting edge of the blade 38 extends somewhat beyond the periphery and beyond one end of the cylindrical body 36 so that, in the assembly with the cutter body 34, the blade can extend beyond the periphery of the cutter body through appropriate slots in such periphery.

In order to lock the cutter carrying bodies or matrices 36 in the cutter body 34, round tapered locking pins 39 may be provided. These are driven into and are wedged into engagement in suitable matching complementary grooves 39a and 39b at the inner sides of the cutter-matrix-receiving sockets in the body 34 and in the matrices, respectively.

In the arrangement shown in Figure 7, it will be appreciated, that the cutter elements 35 may be oriented in any desired position to provide the particular cutting characteristics desired, that is, the angles of the blades with respect to the axis of the tool may be varied as desired to accommodate the particular cutting job involved.

It will be appreciated that in the cutter elements 35, a single cutting bit or blade is received and locked by infiltration in its individual matrix, and that this is but one example of numerous single point cutting tools or implements that may be similarly provided.

Where, due to the desired angularity of bit receiving sockets 40 in a matrix 41 (Fig. 10) the arrangement shown more or less schematically in Fig. 4 may not be practical for compacting the matrix, a compacting die structure including a mold member 42 and opposed upper and lower die punch members 43 and 44 may be used. The punch members are relatively reciprocable in a bore 45 in the mold or die member 42. The upper punch member has a counterbore-forming projection 46 and a central bore 47 for receiving a central bore-forming stem or core rod 48. On the pressure face of the punch 43 and radiating from the boss 46 is a key slot-forming rib 49. The opposing face of the lower punch 44 is configurated to provide the desired face surface contouring of the matrix 41.

At its side and adjacent the top forming end face thereof, the punch 44 is provided with openings or slots 50 corresponding to the bit sockets 40 to be formed in the matrix. Reciprocably slidable through the slots 50 are respective bit socket-forming reciprocable plungers 51 which are mounted in the mold member 42 and are normally retractably biased by means of respective springs 52 but are operable to enter into socket-forming position by means of respective reciprocable cam actuators 53. This provides a desirable one shot forming of the cutter matrices.

Following the matrix molding operation, the matrix 41 is sintered and then equipped with bit blades and copper infiltrated in the manner hereinbefore described.

For preparing single bit matrices, simpler pressure molding apparatus on the order of that shown more or less schematically in Figure 11 may be used. Such apparatus includes a female die or mold member 55 having a bore 57 from the opposite ends of which are operable respectively an upper punch 58 and a lower punch 59, with the opposing ends of the punches appropriately contoured to afford the respective opposite end configurations and contours required for a matrix 60 to be formed therebetween. In other words, the opposing ends of the compression punch members 58 and 59 provide die surfaces.

In the specific instance illustrated in Figure 11, the pressure molding die apparatus is arranged to produce matrices for supporting respective insert cutter bits 61 such as shown in Figures 12, 13 and 14. For this purpose the working end of the matrix 60 is provided with an endwise opening bit socket slot 62 formed by a complementary projection 63 on one of the compression punches, herein the compression punch 58. It may be preferred to machine a chip clearance groove or surface on the end of the matrix 60 alongside the bit socket 62 after the bit is infiltration locked therein. However, where it is desired to mold the chip clearance during compacting, the punch 58 may be provided with a chip clearance grooving surface portion 64 which is effective to provide a chip clearance groove 65 in one side of the working end portion of the matrix. At juncture of the chip clearance groove 65 with the bit socket 62 is preferably provided a blunt shoulder 67 which is spaced substantially in axial direction inwardly relative to the remainder of the working end portion of the matrix on the opposite side of the socket 62. Through this arrangement, the bit 61 having a shape complementary to the socket 62 and fitting closely therein has a working face overhang or shoulder 68 which overlies the matrix shoulder 67 so that the working face of the bit merges with the adjacent surface of the chip clearance groove 65. This enables the provision of a smoother overall chip clearance.

Along the chip clearance groove side of the matrix 60 is provided a longitudinal keying groove 69 provided in the compacting of the matrix by a corresponding grooving rib 70 on the die mold member 55 within the compacting bore 57.

As shown in Figures 12 and 13, a substantial plurality of the matrices 60 and supported bits 61, after infiltration of the matrices 60 are adapted to be supported by a tool holder 71 which may be of conventional material such as soft steel, ductile iron, nodular iron, or the like, but may, if preferred comprise a sintered metal body or aluminum or other casting, or suitable plastic, depending upon working requirements. In any event, as shown, the body 71 is of the 45° angle face mill type having a beveled margin 72 provided with a suitable plurality of cutter sockets 73 within which the bit holding matrices 60 are inserted and locked in with the bits 61 thereof held at the proper working angle, by means of keying means such as pins 74 engaging in the keying grooves 69 of the body 60 and corresponding complementary opposite keying grooves in the walls defining the respective bores 73. Should any one of the cutter holders 60 require replacement, it can readily be knocked out by application of a tool to the inner end thereof through a knock-out opening 75 in the cutter body 71.

It should be understood that the same principles of construction as shown in Figures 12, 13 and 14 may be applied to a wide variety of cutters, either single bit or multiple bit or blade cutters by varying the shape of the blades or bits and varying the exact placement thereof with respect to the respective holders or matrices 60.

In Figure 15 is depicted how the present invention can be applied in the provision of multi-bit segmental holders or matrices of which the sintered metal holder or matrix 77 is an example. This is formed as an individual segment of predetermined length and radius adapted to be used with similar segments on a cutter body such as a face mill or the like, being for this purpose provided with bolt holes 78 for attachment to the carrying body. A suitable plurality of cutter bits 79 are mounted in suitable sockets in the working face of the holder matrix 77 and retained therein by infiltration in the manner hereinbefore described. This segmental form of cutter is especially suited to larger diameter cutters.

In Figure 16 is shown a similar arrangement adapting the segmental matrix holder principle to a matrix structure 80 arranged to support cutter bits or blades 81 in a relatively angular, overlapping relation best suited to use in a saw structure. The segmental infiltrated sintered powdered metal matrix or holder 80 is constructed and arranged to be supported together with other similar blade bit holders upon a saw blade body disk 82. While the specific example shown in Figure 16 is of a metal cutting saw, it will be appreciated that the same principle is applicable to stone cutting saws and other types of saws where the use of hardened teeth or blade bits is desirable.

In Figures 17 and 18 is illustrated an exemplary adaptation of the invention to a disk or wheel type of cutter structure wherein cutting bits or teeth are supported on the periphery of a disk holder or body. To this end, a sintered metal disk matrix holder body 83 is provided having peripherally opening cutter bit sockets 84 within which are fixed by infiltration growth-binding respective cutter bits or blades 85. In this instance, the cutter assembly is of the concave or corner-round type.

Adaptation of the invention to a radius or convex cutter structure is depicted in Figures 19 and 20. For this purpose, a disk or wheel type, sintered metal, matrix holder body 87 is provided with peripherally opening cutter bit or blade sockets 88 within which are infiltration growth-bound butter bits or blades 89. In this form of cutter as well as in the form of cutter shown in Figures 17 and 18, the periphery of the cutter bit holder is provided with suitable chip clearance recesses or grooves adjacent the working side of the respective cutter bit sockets and cutter bits.

Adaptation of the invention to built-up types of cutters such as sectional form cutters is illustrated in Figure 21. For such an arrangement appropriately shaped respective sintered metal, blade bit sectional supporting rings 90 are peripherally provided with infiltration growth-bound circumferentially spaced blade bits 91, properly angularly disposed and with their opposite ends overlappingly related in the assembly of the blade bit supporting matrix holder rings 90 upon a mandrel (not shown).

In Figure 22 is shown a similar arrangement wherein substantially alike cylindrical sintered metal supporting matrix ring members 92 carry peripherally a suitable series of infiltration bound cutter bits 93, with the several cutter rings arranged to be supported upon a suitable mandrel, and providing a slab mill.

By way of example of the adaptation of the invention to various forms of single point tools, such as may be used in boring bars and on lathes or similar types of turning or shaping equipment, a typical lathe tool arrangement is shown in Figure 23. This includes a lathe tool body or shank 94 which in the present instance is provided with a working end portion recess or seat 95 for readily-removable engagement therein of a bit supporting matrix holder 97 of sintered metal carrying an infiltration growth-bound bit cutter 98. A clamp 99 removably holds the blade carrying matrix 97 in its pocket or recess seat 95 in the tool shank 94.

Percussive tools are advantageously equipped with hard tips or bits according to the principles of the present invention. By way of example in Figure 24 is shown a chisel type tool including a body or shank member 100 arranged to have removably secured thereto a sintered metal matrix bit holder 101 arranged to carry a chisel bit tip element 102 fixed thereto by infiltration growth binding. For this purpose the tip end of the matrix 101 is provided with a tip-ward opening groove socket 103 within which a complementary shank or base projection flange portion 104 of the bit is fitted and infiltration locked in the manner hereinbefore described. A base flange projection 105 on the holder matrix 101 fits into a complementary socket groove 107 of the tool body 101 and may be secured therein as by means of screws or bolts 108. Similar principles of construction may be applied to star drills, and the like.

In adapting the invention to scoring blade or knife type of tools or implements, a hardened edge ring is provided for attachment to the periphery of a supporting disk or ring member. For example, referring to Figure 25, a slitter or shearing knife edge ring or rim 110 which may be a hard cutting material such as cemented carbide or ceramic and provided with an anchoring medial radially inwardly projecting flange 111. A disk shaped powdered metal body 112 may then be molded and compacted onto the inner diameter of the cutting bit rim 110 and sintered. Then upon infiltration a tight grip securely attaching the cutter rim or bit 110 to the supporting matrix 112 is effected. It will be appreciated, of course, that if preferred the bit rim 110 could also be made up of a plurality of segments united with the supporting matrix 112 after sintering of the matrix. On the other hand, the sintered body 112 may be made, in sections and assembled within the rim 110 before infiltration, and then bonded together as a result of infiltration. It should also be noted that although the cutter bit rim 110 is shown as provided with square, side cutting edges it could just as well be provided with a peripherally projecting tapered edge at one or both sides or medially disposed, especially where use as a slitter or scoring disk or knife or wheel is contemplated.

In another manner of constructing a knife type of cutting or scoring tool, Figure 26 depicts how a hard edge ring bit element 113 with a radially inwardly projecting anchoring flange structure 114 may be supported by a matrix arrangement including a pair of sintered metal disk members 115 which are presintered and then assembled together within the ring bit 113 and secured together as by means of respective bolts 117, whereafter infiltration is effected for binding the ring bit 113 in the assembly. It has been found that after infiltration the abutting plates 115 are bonded together by the infiltrant.

The invention also lends itself readily to incorporation in gear structures exemplified in Figures 27 and 28. In a gear having external teeth, a supporting sintered body matrix 118 is provided having suitable peripheral socket pockets or a groove 119 within which shank flange portions 120 of individually formed gear teeth 121 are received and bound by infiltration growth gripping in the manner hereinbefore described.

In Figure 29 is shown an internal ring gear including a ring body holder 122 having hard gear teeth 123 fixed to the inner diameter or periphery by infiltration growth binding.

Many other types of tools and implements are, of course, adapted for the use of the present invention. As one example of a gripper or wear tip adaptation, there is shown in Figure 30 a typical picker finger of the type used in the textile industry and including a finger body 125 which is adapted to be made as a powdered metal sintered matrix and which is suitably socketed at its tip end portion so that a hard wear resistant point or tip 127 can be secured thereto by infiltration growth binding pursuant to the invention.

In addition to the numerous advantages deriving from the effective, inexpensive manner of supporting bits of the various types hereinbefore described, as well as others that will readily suggest themselves, great advantage derives from the vibration damping characteristics inherent in the relatively "dead" material of the sintered powdered metal matrices. As a result, chatter vibrations and noises due to vibration in operation are virtually eliminated or at least minimized to a substantially inconsequential degree. In the use of cutting tools embodying the present invention, therefore, this enables substantially increased production at lower production costs due to greater operating speeds and more rapid and deeper feed. In wear-tipped tools or implements involving high speed frictional engagement with work surfaces or cooperating working parts, elimination of the vibration factor enables quiet, long life operation.

Although for most purposes the use of sintered powdered metal holders for the bits will be found most practical, some practical structures are adapted to be made using other powdered metal compositions such as a combination of powdered metal and a synthetic resin known under the trade name "Devcon" which has the advantage of enabling the production of a compact without heat. Upon setting of the synthetic resin binder, there is sufficient growth so that upon solidification of the matrix a bit mounted or embedded therein will be firmly gripped. Of course the matrix thus provided will not possess the inherent tensile and compression strength of a sintered metal matrix. However, the powdered metal and synthetic resin matrix does afford great advantage in being a "dead" material and thus serving as a vibration damper for quiet, chatter free and substantially vibration proof operation.

It will be understood that modifications and variations may be effected without departing from the scope of the novel concepts of the present invention.

We claim as our invention:

1. A cutting tool including a sintered powdered ferrous metal matrix having a socket opening therefrom, a cutting bit having a portion thereof within said socket, and the walls of said socket opposingly gripping said cutter bit portion and comprising the ferrous matrix alloyed with copper by infiltration growth and being under shrinkage compression binding, gripping, retaining engagement with said cutter bit portion.

2. In a method of fastening a hard element and a porous sintered ferrous compact matrix together, assembling the element and the matrix with opposing surfaces thereof in adjacency, and copper infiltrating and alloying the matrix of the sintered compact and thereby effecting growth displacement of the surface areas of the matrix contiguous to the hard element into intimate binding engagement with the element to lock the element and member together.

3. In a method of locking a hard bit and a sintered ferrous matrix compact together, the steps of assembling the bit and matrix into substantially fixed relation with surfaces of the bit and matrix in opposed adjacency and related to be in clearance gap relation due to differences in coefficient of expansion of the bit and the matrix when heated, and copper infiltrating the matrix with the bit in said relationship and alloying the copper and the ferrous structure of the matrix in said opposing surface of the matrix and effecting mobility and growth of the ferrous structure expansively into engagement with the opposing bit surface for locking the bit to the matrix.

4. In a method of making an implement, the steps of compacting a ferrous powdered metal matrix, sintering said matrix, inserting a portion of a hard bit into a socket in the sintered matrix with opposing surfaces of said portion and of the matrix in said socket in adjacency, and infiltrating the matrix with an alloying growth producing molten metal to effect binding compression of the matrix surfaces in the socket against the opposing surfaces of said bit portion whereby to lock the bit rigidly in place on the matrix.

5. In a method of making an implement, the steps of forming a sintered powdered ferrous metal matrix with a socket providing opposing spaced walls, heating the sintered compact to effect expansion and spreading of said walls apart so as to afford a gap clearance relative to surfaces of a bit inserted in said socket between said walls, and copper infiltrating the sintered compact to effect alloying and infiltration growth of the compact at said walls for growth of the walls to take up said clearance gap and effect an intaglio gripping relation of the opposing surfaces of the bit, and then cooling the sintered and infiltrated compact to effect further gripping and compression of said walls against the bit upon shrinkage of the material of the compact.

6. In a method of making a substantially vibration free implement, mounting a hard bit element on a supporting matrix of predominantly powdered ferrous substantially "dead" vibration damping material as a supporting body for the bit element, and effecting growth of the matrix material by the action of growth effecting material disposed in a fluent condition substantially uniformly within the matrix at least adjacent to the bit element and thus displacing the element-opposing portions of the matrix material toward the bit element for intimately grippingly directly engaging the bit element by the material of the matrix to effect retention of the bit element upon the matrix.

7. In a method of fastening an element such as a bit of a hard material having a melting point substantially higher than the melting point of copper and a high frequency vibrational range with a supporting body of substantially "dead" low frequency vibrational range, comprising compacting and sintering a predetermined size body of powdered iron to provide a porous sintered matrix, forming in said body and opening therefrom a socket recess partially receptive of said element with close tolerance, after sintering of the member assembling the element within said socket recess and with the element projecting from the member except where engaged within the socket recess, heating the assembly up to the melting point of a copper infiltrant and during such heating effecting expansion of the surfaces of the socket recess relative to and away from the opposing surfaces of the element, continuing the heating to the melting point of a copper infiltrant and at such melting point filling the pores in the matrix of the body at least contiguous the surfaces thereof defining said socket recess and alloying the copper infiltrant with the skeleton of the matrix to afford mobility of the metals of the body and the infiltrant and growth of the matrix toward the element portion within the socket recess to thereby fill the thermally produced space from the opposing surfaces of the element and thereby crowding the matrix into intaglio binding and gripping action upon the engaged portion of the element, and then cooling the assembly and effecting additional shrinkage of the matrix upon the engaged portion of the element supplementary to the infiltration growth engagement of the engaged portion of the element to afford a positive and uniform interlock of the opposing surfaces of the element and matrix of the body.

8. The method of claim 7, characterized in that the socket recess is formed in the powdered iron body during compacting thereof and before sintering.

9. The method of claim 7, further characterized in that the socket recess is formed in the body member after sintering thereof has been completed.

References Cited in the file of this patent

UNITED STATES PATENTS

| | | |
|---|---|---|
| 1,043,831 | Heinkel | Nov. 12, 1912 |
| 1,267,782 | McKerahan | May 28, 1918 |
| 1,273,248 | Lurker | July 23, 1918 |
| 1,518,856 | Lapp | Dec. 9, 1924 |
| 1,547,839 | Steenstrup | July 28, 1925 |
| 1,843,549 | Firth | Feb. 2, 1932 |
| 1,848,182 | Koebel | Mar. 8, 1932 |
| 1,896,853 | Taylor | Feb. 7, 1933 |
| 1,904,049 | Hoyt | Apr. 18, 1933 |
| 2,036,656 | Stowell | Apr. 7, 1936 |
| 2,135,380 | Benge | Nov. 1, 1938 |
| 2,252,005 | Hintermeyre | Aug. 12, 1941 |
| 2,275,420 | Clark | Mar. 10, 1942 |
| 2,325,746 | Curtis | Aug. 3, 1943 |
| 2,358,499 | Fiedler | Sept. 19, 1944 |
| 2,409,307 | Patch et al. | Oct. 15, 1946 |
| 2,455,183 | Lobdell | Nov. 30, 1948 |
| 2,482,342 | Hubbert | Sept. 20, 1949 |
| 2,541,899 | Wellman | Feb. 13, 1951 |
| 2,607,108 | See | Aug. 3, 1952 |

FOREIGN PATENTS

| | | |
|---|---|---|
| 312,320 | Great Britain | Apr. 10, 1930 |